United States Patent
Oliver et al.

(10) Patent No.: US 6,419,057 B1
(45) Date of Patent: Jul. 16, 2002

(54) POWER-OFF DAMPING IN MR DAMPER

(75) Inventors: Michael Leslie Oliver, Xeria; William Charles Kruckemeyer, Beavercreek, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/759,859

(22) Filed: Jan. 12, 2001

(51) Int. Cl.[7] .................................................. F16F 9/53
(52) U.S. Cl. ................ 188/267.2; 188/318; 188/322.2; 267/64.15
(58) Field of Search ........................... 188/267.2, 267.1, 188/267, 318, 322.13, 322.15, 322.22, 322.2; 267/140.14, 140.15, 136, 64.15; 701/37

(56) References Cited

U.S. PATENT DOCUMENTS

| | | | | |
|---|---|---|---|---|
| 5,284,330 A | * | 2/1994 | Carlson et al. | 267/140.14 |
| 5,346,192 A | * | 9/1994 | Welth et al. | 267/140.14 |
| 5,632,361 A | * | 5/1997 | Wulff et al. | 188/267.2 |
| 5,878,997 A | * | 3/1999 | Miesner | 267/140.14 |
| 6,129,185 A | * | 10/2000 | Osterberg et al. | 188/267.2 |
| 6,279,701 B1 | * | 8/2001 | Namuduri et al. | 188/267.2 |
| 6,296,088 B1 | * | 10/2001 | Carlson | 188/267.2 |

* cited by examiner

*Primary Examiner*—Douglas C. Butler
(74) *Attorney, Agent, or Firm*—Scott A. McBain

(57) ABSTRACT

A magneto-rheological (MR) damper provides a higher than minimum level of damping when a power source to the MR damper is not supplying a control current. The present invention damper includes magnets positioned to direct a magnetic flux across a MR fluid path. The fluid path is created when a rod and piston assembly stroke the fluid though a control valve assembly attached to a damper chamber causing a resistance to MR fluid flow. An electric coil cancels an effect of the permanent magnets when the control current is available to allow a control circuit more operating range. The permanent magnets allow for damping when no control current is available.

13 Claims, 1 Drawing Sheet

POWER-OFF DAMPING IN MR DAMPER

BACKGROUND

This invention relates generally to a damper for use between corresponding parts as in a vehicle suspension application. In particular the invention deals with magneto-rheological fluid dampers and their ability to provide dampening characteristics in various power states.

Traditionally, a damper such as a shock absorber or a strut, is installed between corresponding parts where motion in a first part is to be damped in reference to a second part. A traditional damper consists of a body and a piston attached to a rod. The body has a smooth cylindrical interior surface and has an attachment feature at a closed end. The piston slides on the interior surface of the body, and the rod projects out an open end of the body. The open end where the rod projects is sealed around the rod, allowing only the rod to slide in and out of the body. An end of the rod outside the body has an attachment feature. Sealed inside the body is a liquid used as a damping fluid. Also, inside the damper body is a sliding piston that contains a volume of pressurized gas used to allow for fluid volume changes. In use, the attachment features of the rod and the closed end of the body are attached between parts to be damped such as between an automotive frame and a movable part of an automotive suspension. When the parts move, the damper strokes or changes length by the rod and piston moving within the body of the damper. When a force from the parts is applied to the damper, the force is transmitted to the damping fluid forcing the fluid through a restriction mechanism, thereby damping the parts. In magneto-rheological (MR) dampers, MR fluid (fluid containing iron particles) is used and the damping restriction mechanism is a magnetic flux established in the MR fluid. The magnetic flux is generated by electric coils with the level of damping generally proportional to the amount of electric current supplied to the coil. If no current is supplied to the damper coil, damping is at a minimum level. This presents obvious problems in that a current must be constantly supplied to the damper in order to provide a greater than minimum dampening effect by the MR damper.

Thus, what is desired is a MR damper that will provide a greater than minimum level of dampening when the power source is off.

SUMMARY OF INVENTION

The present invention is a MR damper that provides a higher than minimum level of damping when a power source to the MR damper is not supplying a control current. The damper of the present invention includes permanent magnets positioned to direct a magnetic flux across a MR fluid path causing a resistance to MR fluid flow. An electric coil cancels an affect of the permanent magnets when the control current is available to allow a control circuit more operating range. The permanent magnets allow for damping when no control current is available.

The various features and advantages of this invention will become apparent to those skilled in the art from the following detailed description of the presently preferred embodiment. The drawings that accompany the detailed description are described as follows:

DETAILED DESCRIPTION OF A PREFERRED EMBODIMENT

Figure 1:
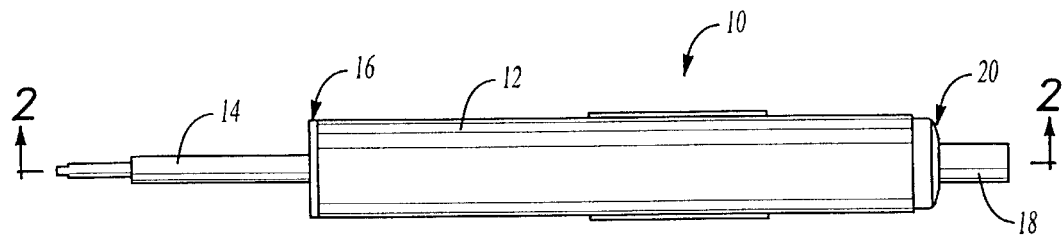
FIG. 1 is a perspective top view of a damper assembly of the present invention.

In FIG. 1 a magneto-rheological (MR) damper assembly of the present invention is shown generally at 10. The MR damper assembly comprises a cylindrical housing 12, a rod 14 exiting a first end 16 of the housing 12, and an attachment assembly 18 exiting a second end 20 of the housing 12.

Figure 2:
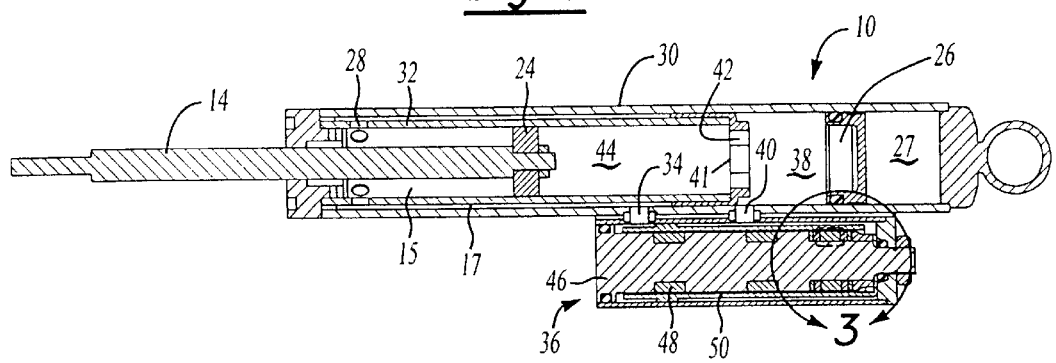
FIG. 2 is a cross-sectional view along line A—A of FIG. 1.

In FIG. 2, a cross section of the MR damper assembly 10 is shown. The MR damper assembly 10 is comprised of a rod 14 attached to a piston 24 and a gas cup 26. The interior chamber 15 is filled with MR fluid. An area 27 partitioned by the gas cup 26 contains a pressurized gas. The gas cup 26 and pressurized gas allow for fluid volume changes due to thermal expansion and displacement due to rod 14 movement. As will be appreciated by those skilled in the art, the piston 24 has no control valving. The damper assembly 10 is configured so that a stroking of the rod 14 and the piston 24 forces fluid through a side mounted control valve 36. When the rod 14 is moved or stroked out of the assembly 10 (a rebound stroke), MR fluid above the piston 24 flows through an orifice 28 to a passage 17 between a first tube 32 and a second tube 30, and through an orifice 34 to the control valve 36. Fluid is routed through the control valve 36 and returns to a lower damper chamber 38 through an orifice 40. The fluid continues through a passage 41 in a piston stop 42 to an area 44 under the piston 24. Flow is reverse to this process during a compression stroke.

In the control valve 36, fluid is routed past a magnetic core 46. Normal damping control is provided by a plurality of coils 48 located on the core 46. The coils 48 setup magnetic fields in the core 46 and in a baffle 50 that also controls the fluid flow path in the control valve 36. The magnetic fields restrain the flow of MR fluid flowing along the core 46 and thereby provide damping control.

Figure 3:
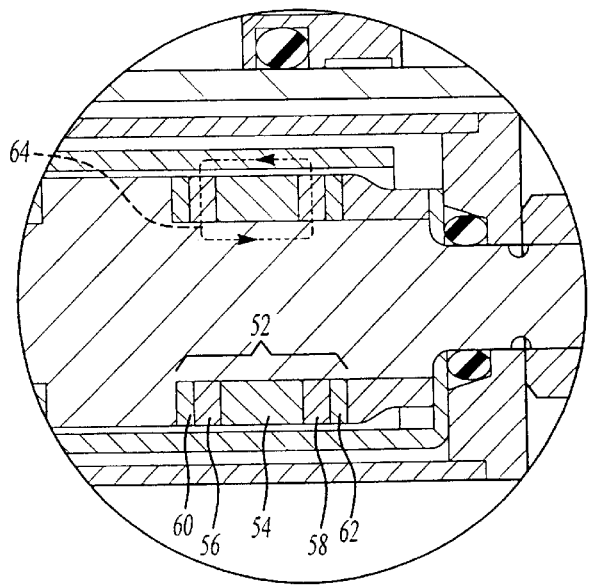
FIG. 3 is a cross-sectional view of a control valve assembly of the present invention.

In FIG. 3 a section of the control valve 36 is shown in closer detail. A power off control assembly, shown generally at 52, is mounted on the core 46. The power off control assembly 52 comprises a coil 54, two ring shaped permanent magnets 56, 58, and two magnetic shields 60, 62. Alternatively, the shields 60, 62 may be absent from the assembly. The permanent magnets 56, 58 are magnetized radially so that a flux path is setup as shown by the phantom arrow at 64. The permanent magnets 56, 58 and associated flux provides flow restriction or resistance without electrical power being supplied.

During powered operation of the damper assembly 10 as shown in FIG. 1, current is supplied to the coil 54 so that a field is created to reduce the effects of the field 64 setup by the permanent magnets 56, 58 and allow the other coils 48, as shown in FIG. 2, along the core 46 to control damping. The magnetic shields 60, 62 are constructed of a magnetically inert material such as aluminum, plastic or stainless steel, and reduce the flux shorting effects of having permanent magnets 56, 58 installed against an core 46 that is constructed of iron and is magnetically soft. Electrical connections (not shown) for the coils 48 and 54 are contained in the core 46.

The coil 54 that reduces the damping of the damper assembly 10 is dependent on power supplied by a circuit that provides a controlled damping current. Whereby, when there is no power being supplied to the control valve 36, the power off control assembly 52 will be active.

This invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A magnetorheological (MR) damper assembly comprising
   a housing with a first end and a second end;
   a piston attached to a rod,
   said rod and said piston being contained within said housing and movable within said housing;
   a first chamber and a second chamber,
   each said chamber filled with a MR fluid,
   said first chamber formed between said piston and said first end of said housing;
   said second chamber formed between said piston and said second end of said housing;
   a control valve assembly adjacent said housing for controlling flow of said MR fluid between said first chamber and said second chamber, comprising:
      a first orifice and a second orifice fluidly connecting said first chamber with said second chamber respectively,
      a magnetic core with a plurality of coils for controlling a fluid flow through said control valve assembly when a power supply to said control valve assembly is in an on condition supplying a current to said plurality of coils;
      a power off control assembly mounted on said magnetic core,
      said power off control assembly comprising a second coil and a plurality of magnets,
      said second coil being activated by said magnets when said power supply is in an off condition,
      said power off control assembly being operable to control said fluid flow through said control valve assembly when said power supply is in an off condition;
      means for operably connecting said first opening of the control valve to said first chamber to provide fluid communication therewith;
      means for operably connecting said second opening of the control valve to said second chamber to provide fluid communication therewith.

2. The damper assembly as recited in claim 1, wherein said power off control assembly further comprises a baffle for control of said fluid flow through said control valve assembly.

3. The damper assembly as recited in claim 1, wherein said core is constructed of iron and said plurality of coils are charged by a current supplied by a power circuit.

4. The damper assembly as recited in claim 1, wherein said power off control assembly further comprises a plurality of magnetic shields.

5. The damper assembly as recited in claim 4, wherein said plurality of magnetic shields are constructed from a magnetically inert material for reducing a flux shorting effect of said magnets in said power off control assembly.

6. The damper assembly as recited in claim 1, further comprising a gas cup contained within said chamber, said gas cup defining an interior area of said chamber, said interior chamber filled with a pressurized gas.

7. A method of controlling the device in claim 1 comprising the steps of:
   a) stroking said piston and said rod in said damper assembly forcing MR fluid between said first chamber and said second chamber through said control valve assembly;
   b) controlling a rate of the MR fluid flow through the control valve assembly by routing the MR fluid through a magnetic field created by said magnetic core with a plurality of coils when the power supply to the control valve assembly is in a power on condition; and
   c) controlling the rate of MR fluid through the control valve assembly by routing the MR fluid through a magnetic field created by the power off control assembly when the power supply to the control valve assembly is in a power off condition.

8. The method as recited in claim 7 further comprising the step of allowing for fluid volume changes during stroking of the piston rod assembly in the chamber by placing pressurized gas in an area of the chamber contained by a gas cup.

9. The method as recited in claim 7 further comprising the step of increasing the effects of the power off control assembly magnetic field by providing a plurality of magnetic shields in the power off control assembly.

10. The method as recited in claim 9 wherein the plurality of magnetic shields is constructed of a magnetically inert material.

11. The method as recited in claim 7 further comprising the step of providing a current to the plurality of coils in the power on condition through a power circuit.

12. The device in claim 1, wherein the means to operably connecting said first opening of the control valve to said first chamber of said housing to provide fluid communication therewith comprises
   said housing comprising a first tube and a second tube,
   said first tube concentric to and contained within said second tube,
   said rod and said piston movable within said first tube,
   a passageway contained between the first tube and the second tube;
   said passageway having a first end and a second end;
   one or more orifices that provide fluid communication between the first chamber and the first end of said passageway; and
   said second end of said passageway in fluid communication with said first orifice of the control valve.

13. The device in claim 1, wherein the means to operably connect said second opening of the control valve to said second chamber of said housing to provide fluid communication therewith comprises
   said second orifice of the control valve assembly; and
   said second orifice operably connected to and in fluid communication with the second chamber of the housing.

* * * * *